(12) United States Patent
Nakahira et al.

(10) Patent No.: US 7,321,620 B2
(45) Date of Patent: Jan. 22, 2008

(54) EQUALIZER AND REPRODUCTION SIGNAL PROCESSING DEVICE

(75) Inventors: Hiroyuki Nakahira, Kyoto (JP); Koichi Nagano, Osaka (JP); Koji Okamoto, Osaka (JP); Akira Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 937 days.

(21) Appl. No.: 10/383,746

(22) Filed: Mar. 10, 2003

(65) Prior Publication Data
US 2003/0185291 A1    Oct. 2, 2003

(30) Foreign Application Priority Data
Mar. 26, 2002    (JP)    ............................. 2002-086120

(51) Int. Cl.
*H03H 7/30*    (2006.01)
*H03H 7/40*    (2006.01)
*H03K 5/159*    (2006.01)

(52) U.S. Cl. .................. 375/232; 375/231; 360/65

(58) Field of Classification Search ................ 375/229, 375/232, 231; 369/53.16, 47.21, 59.16; 360/66, 360/65
See application file for complete search history.

(56) References Cited

U.S. PATENT DOCUMENTS 5,398,259 A * 3/1995 Tsujimoto .................. 375/233
6,304,402 B1 * 10/2001 Nishida et al. ................ 360/66
6,480,447 B1 * 11/2002 Wakabayashi et al. ... 369/47.17
6,678,230 B2 * 1/2004 Miyashita et al. ....... 369/53.16

FOREIGN PATENT DOCUMENTS

| JP | 09-153257 | 6/1997 |
| JP | 2000-138594 A | 5/2000 |
| JP | 2000-182330 A | 6/2000 |
| JP | 2003-014803 A | 1/2001 |
| JP | 2003-006989 A | 1/2003 |
| JP | 2003-085764 A | 3/2003 |

* cited by examiner

*Primary Examiner*—Phuong Phu
(74) *Attorney, Agent, or Firm*—McDermott Will & Emery LLP (57) ABSTRACT

The present invention provides an equalizer capable of accurately compensating for non-linearity of an input signal due to the asymmetry phenomenon, etc., during the disk production process. Two tap coefficients are provided in a coefficient unit. A comparator compares the value of a middle tap signal, which is a reference signal, and a threshold, so as to produce a selection signal based on the comparison result. The coefficient unit selects one of the two tap coefficients as the selected tap coefficient based on the selection signal, and a tap signal is multiplied with the selected tap coefficient. Thus, it is possible to adaptively switch the tap coefficients of the equalizer as a whole based on the value of the middle tap signal, which is the reference signal. Therefore, it is possible to accurately compensate for the non-linearity of the input signal.

6 Claims, 11 Drawing Sheets

EQUALIZER AND REPRODUCTION SIGNAL PROCESSING DEVICE

BACKGROUND OF THE INVENTION

The present invention relates to an equalizer and a reproduction signal processing device, and more particularly to a technique for performing a waveform equalization on a signal with non-linearity.

In a reproduction signal processing device for reproducing information recorded on a recording medium such as an optical disk, vertical asymmetry may appear in the reproduction signal read out from the medium. With an optical disk, for example, a row of pits on the optical disk is irradiated with laser light, and the intensity of the reflected light is read out as a reproduction signal. Due to variations in various conditions such as the power of light used for mastering an optical disk, the size and/or the shape of a pit on the surface of the optical disk may vary, thereby also varying the intensity of the reflected light, thus resulting in a reproduction signal with vertical asymmetry.

Figure 8:
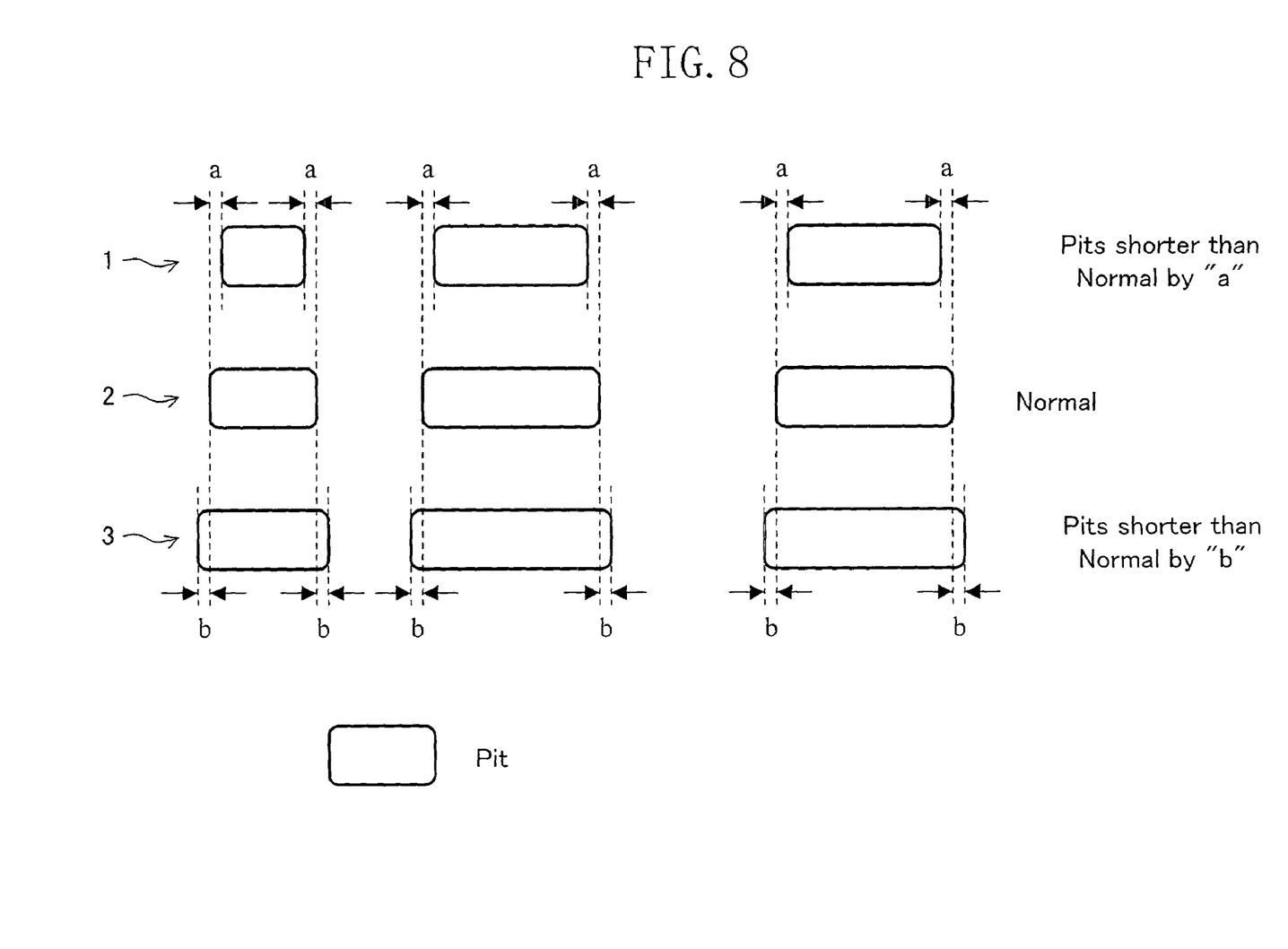
FIG. 8 is a schematic diagram illustrating asymmetry of an optical disk.

FIG. 8 is a schematic diagram illustrating asymmetry resulting from variations in the pit width. Pits along a row (1) have a width that is smaller than that of pits along a normal row (2). Therefore, the row (1) has a longer non-pit pattern than the normal row (2), and thus the reproduction signal from the row (1) has a higher intensity than that from the normal row (2). On the other hand, pits along a row (3) have a width that is larger than that of pits along the normal row (2). Thus, the row (3) has a shorter non-pit pattern than the normal row (2), and thus the reproduction signal from the row (3) has a lower intensity than that from the normal row (2).

Figure 9:
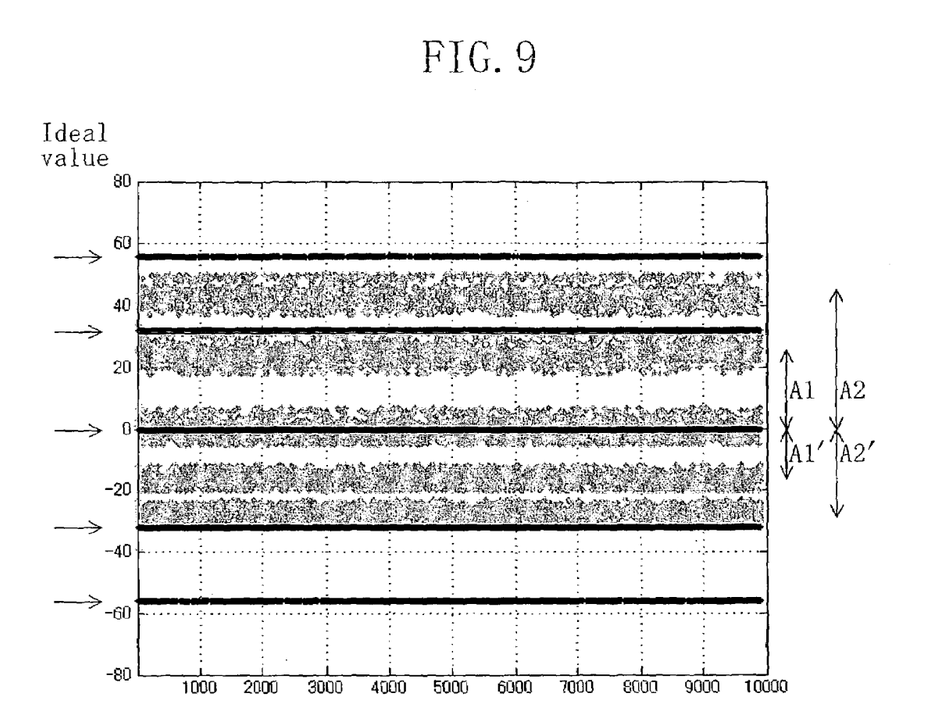
FIG. 9 is a waveform diagram illustrating a digital signal with a vertically asymmetric waveform.

FIG. 9 illustrates signal level samples obtained through A/D conversion of a reproduction signal with vertical asymmetry. With a reproduction signal without vertical asymmetry, the signal levels are distributed in the vicinity of the ideal values, which are indicated by arrows in the figure. However, signal level samples obtained through A/D conversion of a reproduction signal with vertical asymmetry are distributed asymmetrically, as illustrated in FIG. 9, where the amplitude in the upward direction (an amplitude for positive values) with respect to the zero level (the horizontal axis labeled "0"), which is represented by an arrow labeled A1 (or A2 ), is not equal to the corresponding amplitude in the downward direction (an amplitude for negative values), which is represented by an arrow labeled A1' (or A2').

On the other hand, a reproduction signal processing device performs a waveform equalization on a digital signal with an equalizer that typically uses an FIR (Finite Impulse Response) filter. In the waveform equalization, a linear operation called "convolution", as shown in Expression (1) below, is performed. Note that in Expression (1), $x_i$ is an $i^{th}$ tap signal, $c_i$ is a tap coefficient corresponding to the tap signal $x_i$, N is the number of taps of the FIR filter, and y is the waveform-equalized signal.

$$y = \sum_{i=1}^{N} x_i c_i \tag{1}$$

Figure 10:
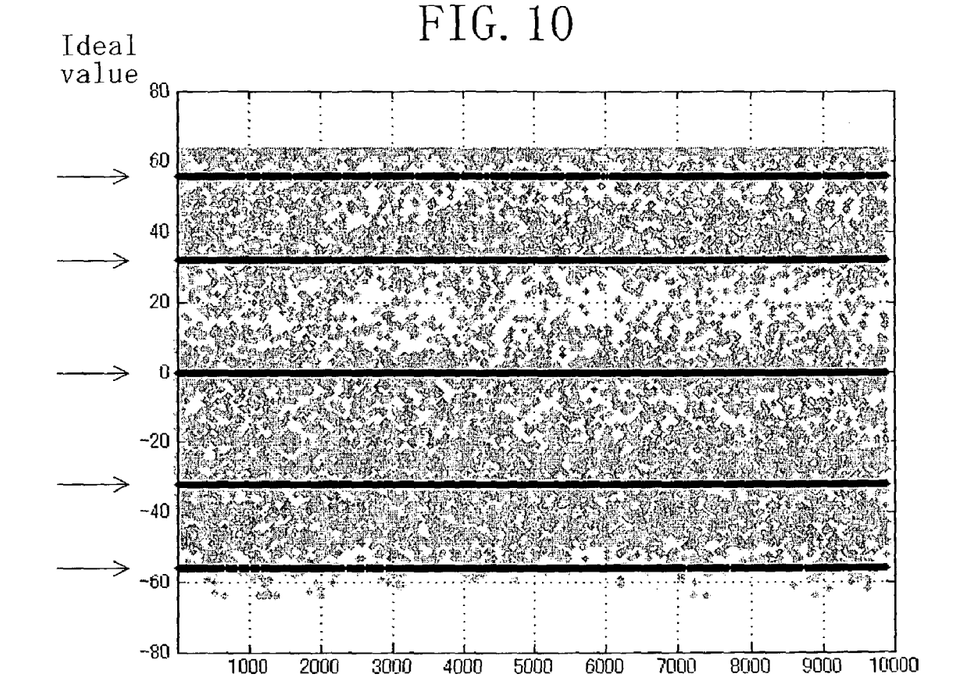
FIG. 10 is a waveform diagram obtained through a waveform equalization performed by a conventional equalizer.

By performing a waveform equalization using convolution, a digital signal is corrected to be closer to the ideal level of either a positive or negative value. However, when a signal with non-linearity as shown in FIG. 9 is convoluted, the results may be diverged as illustrated in FIG. 10.

A technique relating to an equalizer for performing a waveform equalization on a digital signal with non-linearity is disclosed in Japanese Laid-Open Patent Publication No. 09-153257, for example.

Figure 11:
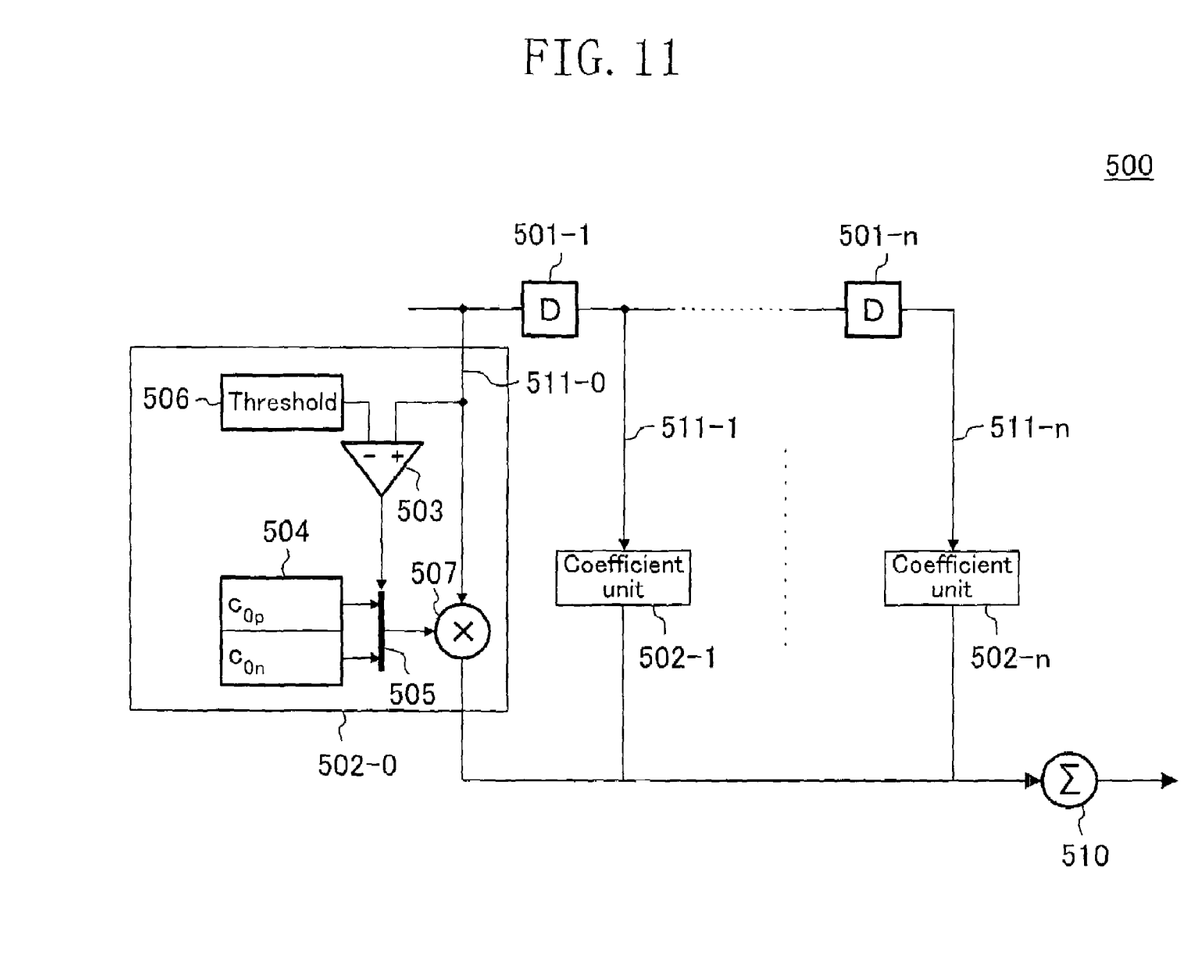
FIG. 11 is a diagram illustrating a configuration of a conventional equalizer.

FIG. 11 is a schematic diagram illustrating an equalizer 500 disclosed in this publication. In the equalizer 500, one of tap coefficients $c_{ip}$ and $c_{in}$ is selected in each coefficient unit 502-$i$ (i=0 to n) based on the sign of the value of a tap signal 511-$i$. Then, the selected tap coefficient is used in the multiplication at a multiplier 507. In this way, the non-linearity of the input signal can be compensated for.

A group of tap signals ("tap signal group") for the equalizer as a whole can be represented by a vector $X=(x_1, x_2, \ldots, x_N)$, and a group of tap coefficients ("tap coefficient group") for the equalizer as a whole can be represented by a vector $C=(c_1, C_2, \ldots, c_N)$. Then, Expression (1) can be expressed as "y=X·C". Herein, as the vector representing a tap coefficient group, a vector $Cp=(c_{1p}, c_{2p}, \ldots, c_{Np})$ can be used to obtain "y=X·Cp" when the tap signal is positive, whereas a vector $Cn=(c_{1n}, c_{2n}, \ldots, c_{Nn})$ can be used to obtain "y=X·Cn" when the tap signal is negative. In this way, the vertical asymmetry of the input signal can be compensated for.

However, in the equalizer 500, a tap coefficient is selected by each coefficient unit 502-$i$ based on the sign of the value of the tap signal 511-$i$ that is received by the coefficient unit 502-$i$. Thus, the elements of the vector Cp and those of the vector Cn coexist in the vector C representing the tap coefficient group of the equalizer as a whole. Then, it is not possible to select the vector Cp or Cn representing a tap coefficient group based on the sign of the value of the tap signal, thereby failing to perform an intended convolution operation. Thus, with the equalizer 500, it is difficult to accurately compensate for the non-linearity of the input signal.

SUMMARY OF TILE INVENTION

The present invention has been made in view of the above, and has an object to provide an equalizer capable of accurately compensating for the non-linearity of the input signal, and a reproduction signal processing device capable of compensating for the non-linearity of a reproduction signal read out from a recording medium such as an optical disk.

In order to solve the problem set forth above, the present invention provides an equalizer for performing a waveform equalization on an input signal, wherein one of a plurality of tap coefficient groups is selected as a selected coefficient group based on a reference signal, which is one of a plurality of tap signals obtained by delaying the input signal, so as to perform the waveform equalization by using the selected coefficient group.

According to the present invention, one of a plurality of tap coefficient groups is selected (as a selected coefficient group) based on the reference signal, which is one of the tap signals. Then, a waveform equalization is performed on the input signal by using the selected coefficient group. Thus, it is possible to adaptively switch the tap coefficient groups of the equalizer as a whole based on the reference signal, i.e., the original input signal, whereby it is possible to compensate for the non-linearity of the input signal, such as vertical asymmetry.

It is preferred that the equalizer of the present invention includes: a signal delay section including a plurality of delay elements connected in series with one another for delaying the input signal by the delay elements so as to provide a signal output from the delay elements as the tap signals, respectively; selection signal production means for producing a selection signal for selecting the selected coefficient group based on the reference signal; a coefficient multiplication section for selecting the selected coefficient group based on the selection signal, and multiplying the tap signals output from the signal delay section with selected tap coefficients that belong to the selected coefficient group by using a plurality of coefficient units provided in the coefficient multiplication section, respectively; and an adder for adding together the tap signals from the coefficient multiplication section, which have been multiplied with the selected tap coefficients, to output a sum as a waveform-equalized signal.

Moreover, it is preferred that the selection signal production means compares a value of the reference signal with a predetermined threshold so as to produce the selection signal based on a comparison result.

Moreover, it is preferred that the selection signal production means uses, as the reference signal, a middle tap signal that is located in a middle among the plurality of tap signals output from the signal delay section.

Moreover, it is preferred that the equalizer of the present invention further includes a coefficient updater including a coefficient learning unit for calculating new tap coefficients for the selected tap coefficients, respectively, so that an error between an actual value of the waveform-equalized signal and an ideal value thereof is reduced, so as to update the selected tap coefficients to the new tap coefficients calculated by the coefficient learning unit, respectively.

In this way, new tap coefficients for the selected tap coefficients are calculated by the coefficient learning unit, respectively, so that the error between the actual value of the waveform-equalized signal and the ideal value thereof is reduced. Then, the selected tap coefficients are updated by the coefficient updater to the new tap coefficients, respectively. Thus, it is possible to update tap coefficients to be closer to values that are optimal for compensating for the non-linearity of the input signal, thereby improving the waveform equalization performance.

It is preferred that the coefficient updater includes coefficient selection means for selecting one of the selected tap coefficients to be updated; and the coefficient learning unit calculates the new tap coefficient for the selected tap coefficient selected by the coefficient selection means.

In this way, one of the selected tap coefficients to be updated is selected by the coefficient selection means, whereby a plurality of selected tap coefficients can be updated with one coefficient learning unit. Thus, it is possible to realize an equalizer with a reduced circuit scale.

The present invention also provides a reproduction signal processing device for processing a reproduction signal read out from a recording medium, the reproduction signal processing device including a waveform equalization section for performing a waveform equalization on a digital signal obtained through A/D conversion of the reproduction signal, wherein the waveform equalization section includes an equalizer for selecting one of a plurality of tap coefficient groups as a selected coefficient group based on one of a plurality of tap signals obtained by delaying the digital signal, so as to perform the waveform equalization by using the selected coefficient group.

According to the present invention, one of a plurality of tap coefficient groups is selected by the equalizer (as a selected coefficient group) based on one of the tap signals. Then, a waveform equalization is performed on the digital signal obtained through A/D conversion of the reproduction signal by using the selected coefficient group. Thus, it is possible to realize a signal reproduction device capable of compensating for the non-linearity of the digital signal, i.e., the non-linearity of the original reproduction signal.

It is preferred that the waveform equalization section includes a coefficient updater for calculating new tap coefficients for selected tap coefficients that belong to the selected coefficient group, respectively, so that an error between an actual value of a waveform-equalized signal and an ideal value thereof is reduced, so as to update the selected tap coefficients to the new tap coefficients, respectively.

In this way, the selected tap coefficients are updated by the coefficient updater to the new tap coefficients, respectively, so that the error between the actual value of the waveform-equalized signal and the ideal value thereof is reduced. Thus, it is possible to update tap coefficients to be closer to values that are optimal for compensating for the non-linearity of the input signal, whereby it is possible to realize a reproduction signal processing device with a higher waveform equalization performance for a reproduction signal with non-linearity.

DESCRIPTION OF THE PREFERRED EMBODIMENTS

Preferred embodiments of the present invention will now be described with reference to the drawings.

First Embodiment

Figure 1:
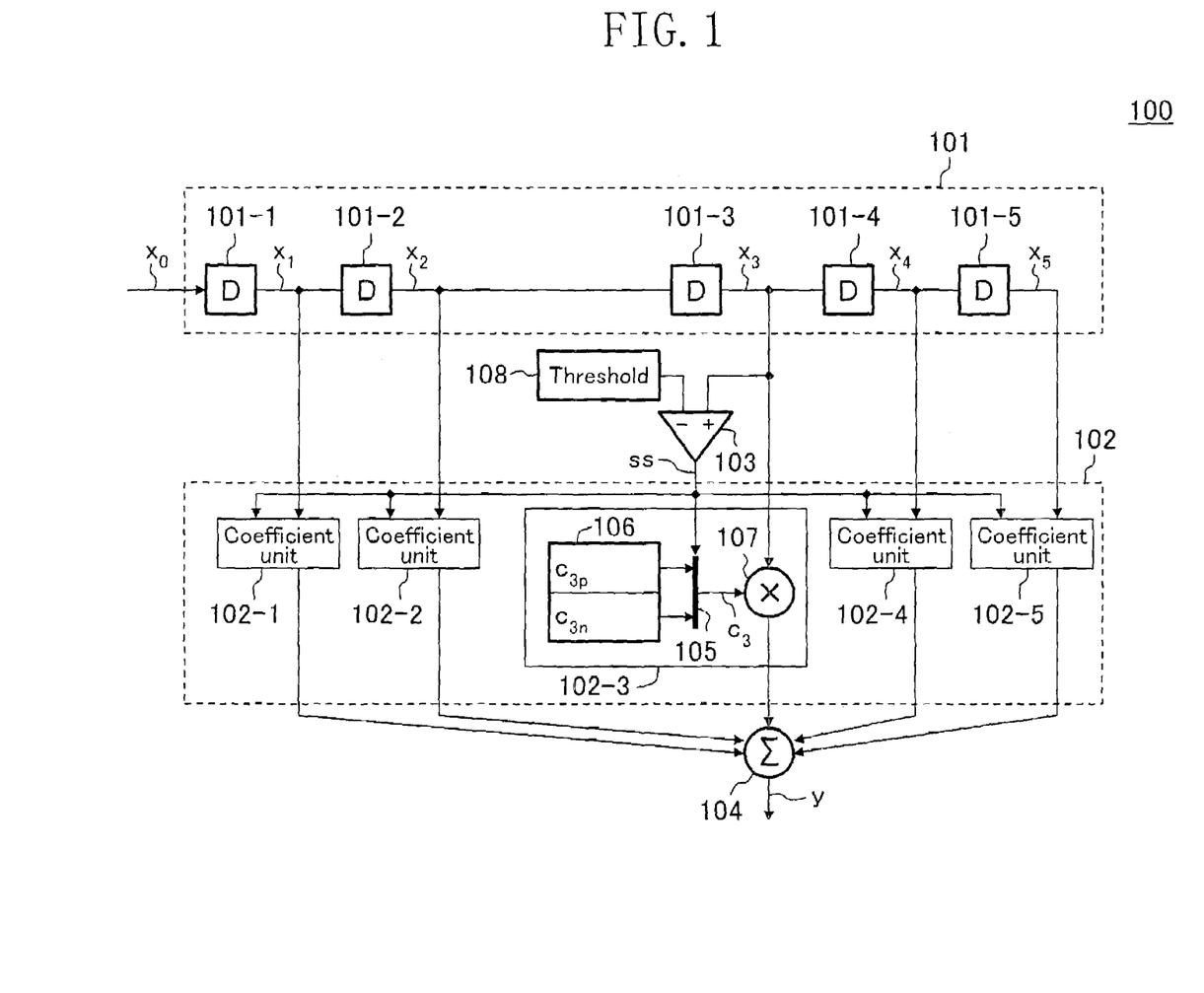
FIG. 1 is a diagram illustrating a configuration of an equalizer of a first embodiment of the present invention.

FIG. 1 illustrates the configuration of an equalizer 100 of the first embodiment of the present invention. Herein, the number of taps of the equalizer 100 is assumed to be 5 for the purpose of illustration. Note that in the present invention, the number of taps is not limited to 5, but may be greater or less than 5.

The equalizer 100 includes a signal delay section 101 including a plurality of delay elements 101-$i$ ($i$=1 to 5 for this and other designations with "-$i$"), a coefficient multiplication section 102 including a plurality of coefficient units 102-$i$, a comparator 103, and an adder 104. Note that the comparator 103 corresponds to the selection signal production means of the present invention.

The signal delay section 101 receives the input signal $x_0$ and outputs the tap signal $x_i$ ($i$=1 to 5). Each delay element 101-$i$ outputs the tap signal $x_i$ by delaying the signal received by the delay element 101-$i$ by one clock cycle.

Each coefficient unit 102-$i$ includes a multiplexer 105, a coefficient storage section 106 and a multiplier 107. The coefficient storage section 106 stores tap coefficients $c_{ip}$ and $c_{in}$ belonging to two different tap coefficient groups Cp and Cn, respectively. The multiplexer 105 selectively outputs one of tap coefficients $c_{ip}$ and $c_{in}$ as a selected tap coefficient $c_i$ based on a given selection signal SS. Then, the multiplier 107 outputs the product between the tap signal $x_i$ output from the delay element 101-$i$ and the selected tap coefficient $c_i$. For example, the tap coefficient $c_{ip}$ is selected as the selected tap coefficient $c_i$ when the value of the selection signal SS is "0", whereas the tap coefficient $c_{in}$ is selected as the selected tap coefficient $c_i$ when the value of the selection signal SS is "1". Note however that this selection method is merely an example, and the present invention is not limited thereto.

The comparator 103 compares the value of a middle tap signal $x_3$ of the signal delay section 101 with a predetermined threshold 108 to produce and output the selection signal SS based on the comparison result. The middle tap signal $x_3$ corresponds to the reference signal of the present invention. Note that it is assumed that the selection signal SS is "0" when the value of the tap signal $x_3$ is equal to or greater than the threshold 108, and is "1" when the value of the tap signal $x_3$ is less than the threshold 108. Note however that the present invention is not limited to this method for determining the value of the selection signal SS.

The adder 104 adds together tap signals $x_i$ from the coefficient multiplication section 102 to output a waveform-equalized signal y.

Next, the operation of the equalizer 100 of the present embodiment will be described. Herein, "0" is set as the value of the threshold 108. Thus, the value of the selection signal SS output from the comparator 103 is switched based on the sign of the value of the tap signal $x_3$.

Now, assume that the tap signal group is represented by a vector X=($x_1$, $x_2$, $x_3$, $x_4$, $x_5$)=(-5, -1, 5, 10, 10). Then, the value of the middle tap signal $X_3$ is "5", whereby "0" is output from the comparator 103 as the selection signal SS. Therefore, a tap coefficient $c_{ip}$ is selected as the selected tap coefficient $c_i$ by each coefficient unit 102-$i$. Thus, a vector Cp=($c_{1p}$, $c_{2p}$, $c_{3p}$, $c_{4p}$, $c_{5p}$) is selected as the tap coefficient group. As a result, the waveform-equalized signal y=X·Cp=(-5)*$c_{1p}$+(-1)*$c_{2p}$+5*$c_{3p}$+10*$c_{4p}$+10*$c_{5p}$ is obtained from Expression (1).

Assume that in the following clock cycle, each tap signal $x_i$ is shifted by one, and the tap signal group becomes the vector X=(-10, -5, -1, 5, 10). Then, the value of the middle tap signal $x_3$ is "-1", whereby "1" is output from the comparator 103 as the selection signal SS. Therefore, the tap coefficient $c_{in}$ is selected by each coefficient unit 102-$i$ as the selected tap coefficient $c_i$. Thus, the vector Cn=($c_{1n}$, $c_{2n}$, $c_{3n}$, $c_{4n}$, $c_{5n}$) is selected as the tap coefficient group. As a result, the waveform-equalized signal y=X·Cn=(-10)*$c_{1n}$+(-5)*$c_{2n}$+(-1)*$c_{3n}$+5*$c_{4n}$+10*$c_{5n}$ is obtained from Expression (1).

As described above, according to the present embodiment, one of the tap coefficient vectors Cp and Cn is selected as the tap coefficient group of the equalizer as a whole based on the sign of the value of the middle tap signal $x_3$, which is the reference signal. Thus, the tap coefficients of the equalizer as a whole can be switched while avoiding the coexistence of the elements of the tap coefficient vectors Cp and Cn, whereby it is possible to perform an intended convolution operation on the input signal $x_0$ with vertical asymmetry. Therefore, the non-linearity of the input signal can be accurately compensated for by the equalizer 100 of the present embodiment.

Note that while the equalizer 100 is not provided with a coefficient unit 102-0, as a coefficient unit for receiving the input signal $x_0$, the equalizer 100 may alternatively be provided with the coefficient unit 102-0.

Moreover, it is assumed in the present embodiment that the comparator 103 receives the middle tap signal $x_3$ as the reference signal. Alternatively, when there are an even number (e.g., 2n) of taps, a tap signal $x_n$ or $x_{n+1}$ may be used as a middle tap signal, i.e., the reference signal. Alternatively, any other suitable tap signal $x_i$ may be used as the reference signal to produce the selection signal SS.

Moreover, it is assumed in the present embodiment that the threshold 108 stores one value, and the coefficient storage section 106 stores the tap coefficients $c_{ip}$ and $c_{in}$ belonging to two different tap coefficient groups Cp and Cn. However, the present invention is not limited to these numbers, and the threshold 108 and the coefficient storage section 106 may store larger numbers of values.

Moreover, it is not necessary that the coefficient storage section 106 is provided in each coefficient unit 102-$i$, but the coefficient storage section 106 may alternatively be provided outside each coefficient unit 102-$i$.

Second Embodiment

Figure 2:
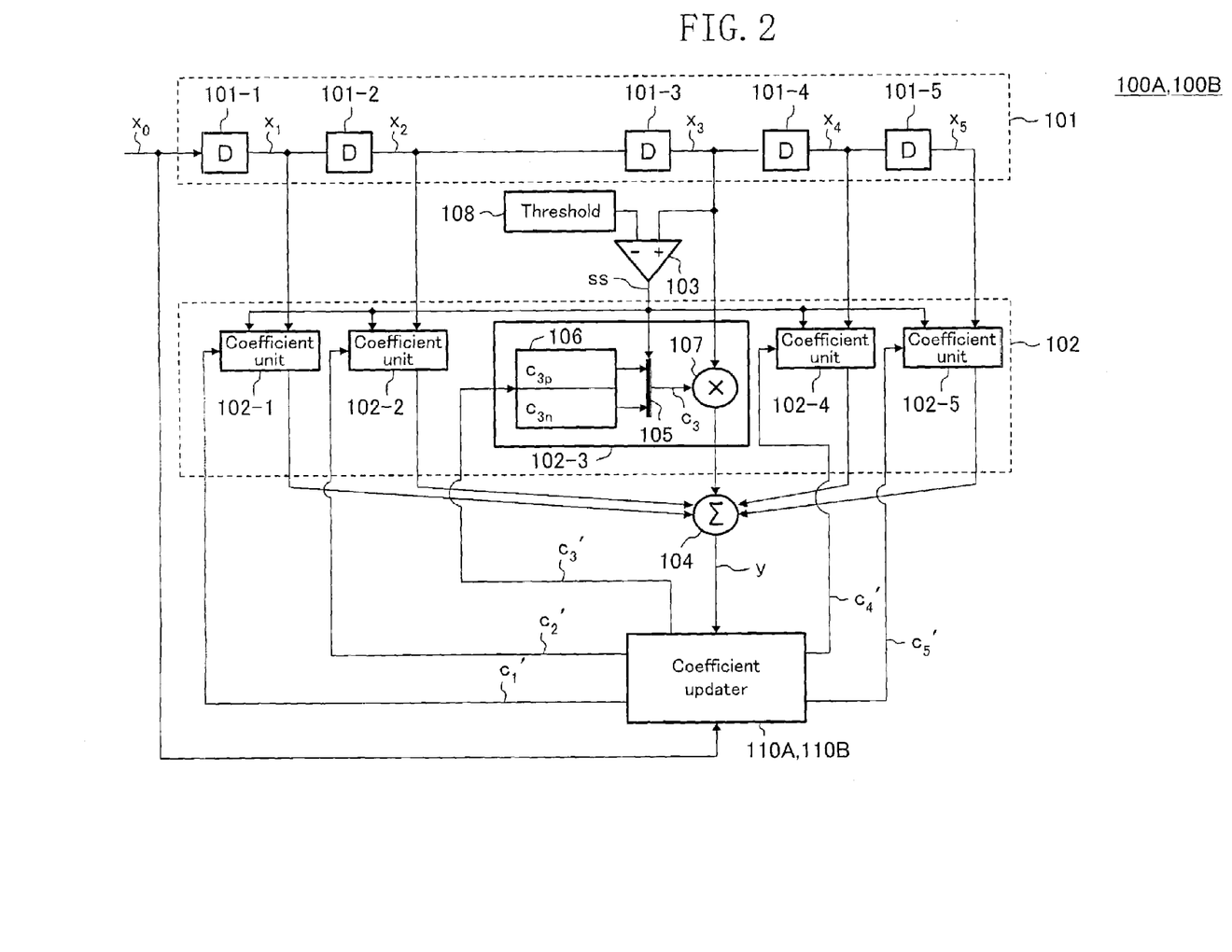
FIG. 2 is a diagram illustrating a configuration of an equalizer of second and third embodiments of the present invention.

FIG. 2 illustrates the configuration of an equalizer 100A of the second embodiment of the present invention. The equalizer 100A is similar to the equalizer 100 of the first embodiment, but further includes a coefficient updater 110A.

The coefficient updater 110A calculates new tap coefficients $c_i'$ for tap coefficients $c_i$ selected by the coefficient units 102-$i$, respectively, and updates one of the tap coefficients $c_{ip}$ and $c_{in}$ in the coefficient units 102-$i$ that is being selected to the tap coefficient $c_i'$. Note that the calculation of the tap coefficient $c_i'$ is performed according to the LMS (Least Mean Square) algorithm, for example.

According to the LMS algorithm, the tap coefficient $c_i'$ is given as a tap coefficient $c_i(nT+1)$ in Expression (2) below. In Expression (2), T is one clock cycle, n is an integer, $c_i(nT)$ is the tap coefficient at time nT, e(nT) is the equalization error (i.e., the difference between the actual value of the waveform-equalized signal y and the ideal value thereof), x(nT) is the input signal, and $\mu$ is a step-size parameter. Note that the step-size parameter $\mu$ is a positive scalar for controlling the amount of correction to be made for each iteration of the tap coefficient update operation. By repeating the operation of Expression (2), it is possible to obtain a tap coefficient $c_i'$ that minimizes the equalization error e(nT).

$$c_i(nT+1)=c_i(nT)+\mu*e(nT)*x(nT) \quad (2)$$

Figure 3:
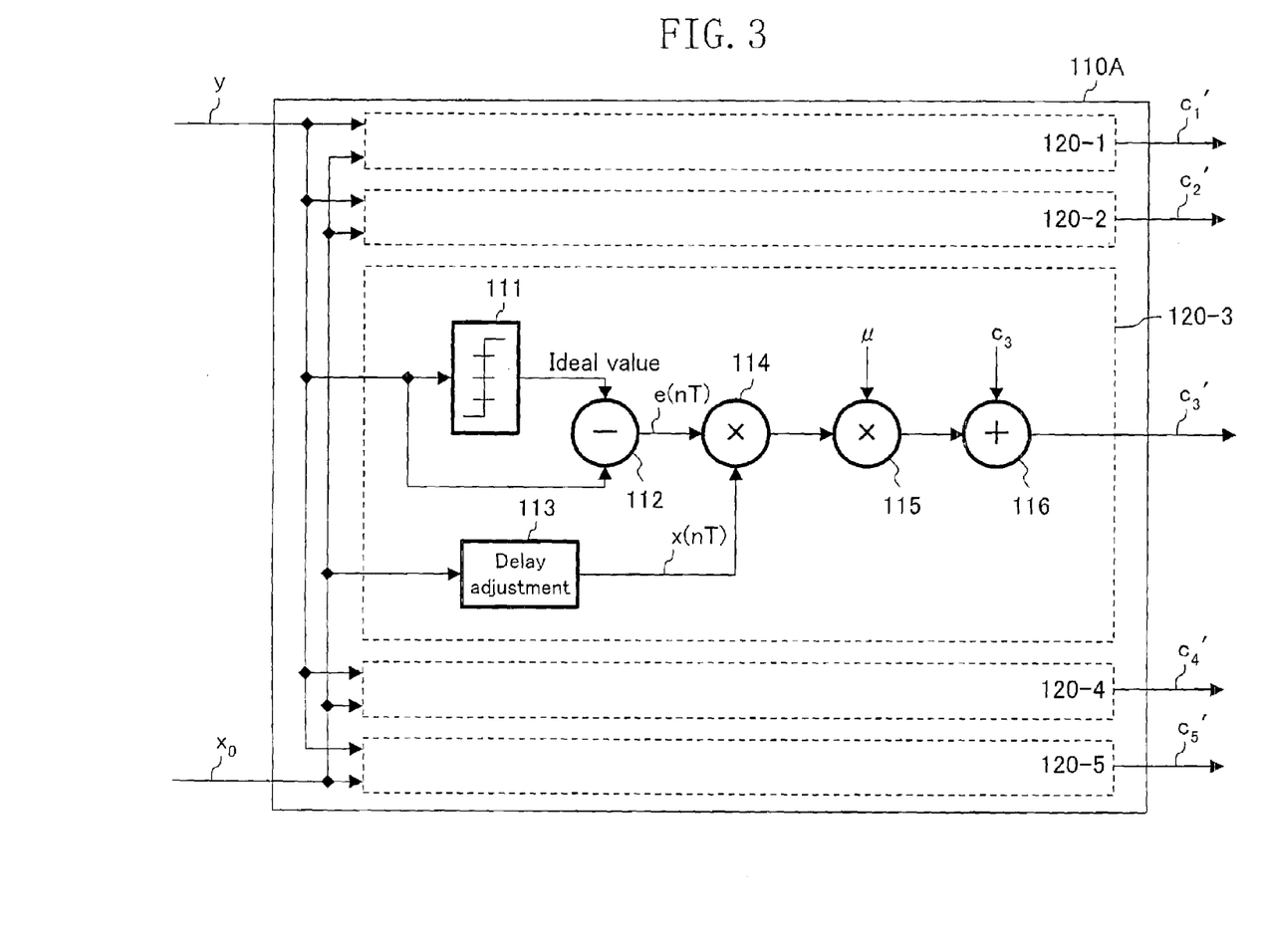
FIG. 3 is a diagram illustrating a configuration of a coefficient updater of second embodiment of the present invention.

Next, the configuration of the coefficient updater 110A will be described. FIG. 3 illustrates the configuration of the coefficient updater 110A. The coefficient updater 110A includes coefficient learning units 120 for performing the operation of Expression (2). The number of the coefficient learning units 120 is equal to the number of the coefficient units 102-$i$.

The coefficient learning unit 120 includes an ideal value determination circuit 111 for determining the ideal value of the waveform-equalized signal y, a subtractor 112 for performing a subtraction operation between the actual value of the waveform-equalized signal y and the ideal value thereof to output the equalization error e(nT), a delay adjustment circuit 113 for adjusting the delay of the input signal $x_0$, a multiplier 114 for multiplying the equalization error e(nT) with the delay-adjusted signal x(nT), a multiplier 115 for multiplying the output from the multiplier 114 with the step-size parameter $\mu$, and an adder 116 for adding the output from the multiplier 115 with the selected tap coefficient $c_i$ selected by the coefficient unit 102-$i$ to output a new tap coefficient $c_i'$.

The delay adjustment circuit 113 adjust the delay of the input signal $x_0$ so that the multiplication operation at the multiplier 114 is performed at the timing at which the convolution operation of the tap signal $x_i$ is performed by the equalizer 100A. The delay adjustment circuit 113 may be functionally the same as the delay element 101-$i$.

As described above, according to the present embodiment, a new tap coefficient $c_i'$ is calculated by the coefficient learning unit 120 so as to reduce the equalization error e(nT). Then, one of the tap coefficients $c_{ip}$ and $c_{in}$ in the coefficient unit 102-$i$ that is being selected is updated to the new tap coefficient $c_i'$. Thus, it is possible to update the tap coefficients $c_{ip}$ and $c_{in}$ to values that are optimal for compensating for the non-linearity of the input signal $x_0$, thereby improving the waveform equalization performance.

Third Embodiment

FIG. 2 illustrates the configuration of an equalizer 100B of the third embodiment of the present invention. The equalizer 100B includes a coefficient updater 110B having a different configuration from that of the coefficient updater 110A of the second embodiment.

Figure 4:
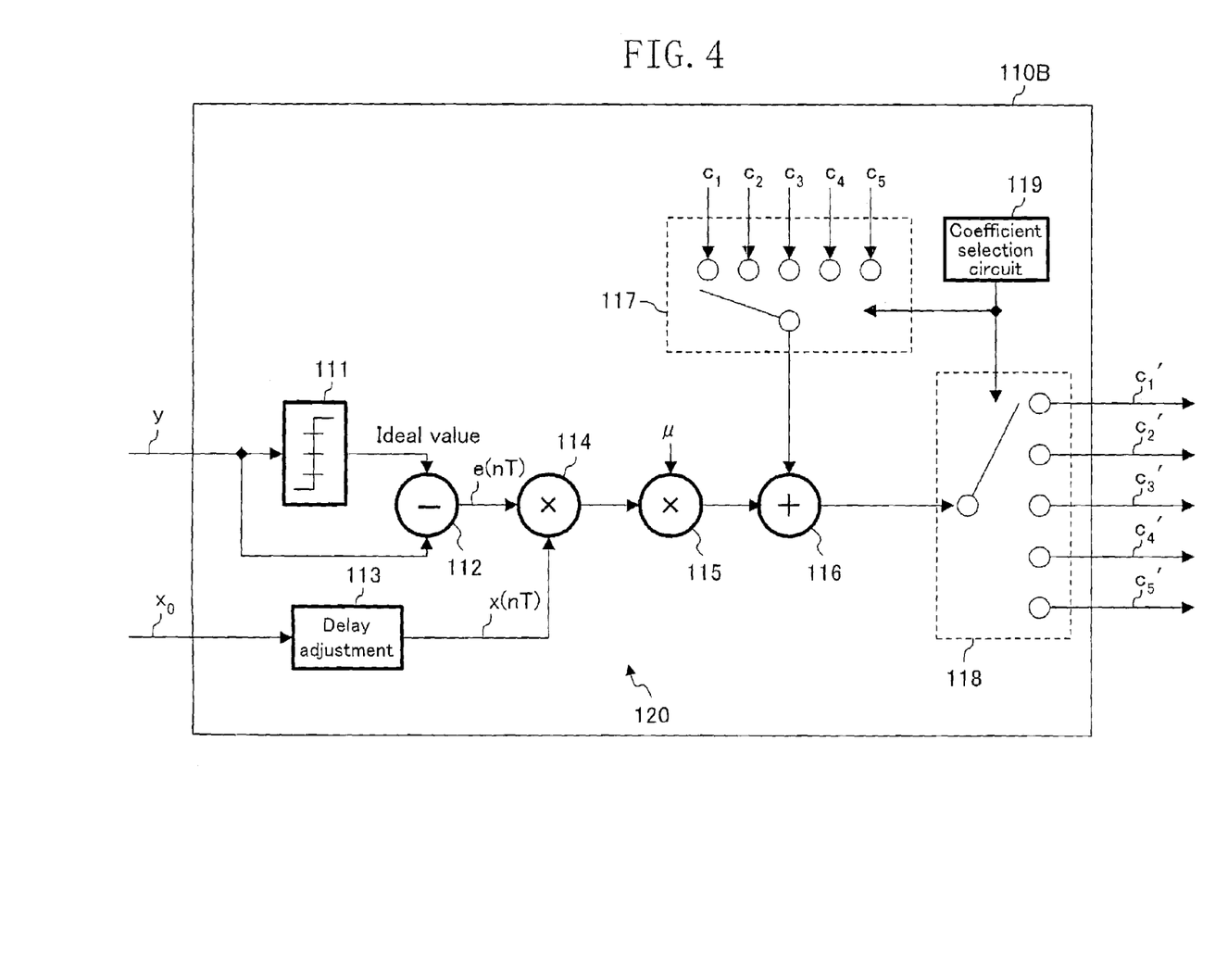
FIG. 4 is a diagram illustrating a configuration of a coefficient updater of third embodiment of the present invention.

FIG. 4 illustrates the configuration of the coefficient updater 110B. The coefficient updater 110B includes a multiplexer 117, a demultiplexer 118, a coefficient selection circuit 119, and one coefficient learning unit 120. Among these components, the multiplexer 117, the demultiplexer 118 and the coefficient selection circuit 119 correspond to the coefficient selection means of the present invention.

The multiplexer 117 selects one of the selected tap coefficients $c_1$ to $c_5$ that are selected by the coefficient units 102-1 to 102-5, respectively. The demultiplexer 118 selects one of tap coefficients $c_1'$ to $c_5'$ to which the output of the coefficient learning unit 120 is provided.

The coefficient selection circuit 119 controls the multiplexer 117 and the demultiplexer 118 so that the selected tap coefficients $c_1$ to $c_5$ are successively selected in the multiplexer 117 and the corresponding tap coefficients $c_1'$ to $c_5'$ are successively selected in the demultiplexer 118. The coefficient selection circuit 119 of the present embodiment can be implemented as a 5-base counter.

The coefficient learning unit 120 of the present embodiment performs the operation of Expression (3) below, unlike that of the second embodiment.

$$c_1(nT+1)=c_1(nT)+\mu*e(nT)*x(nT)$$

$$c_2(nT+2)=c_2(nT+1)+\mu*e(nT+1)*x(nT+1)$$

$$c_N(nT+N)=c_N(nT+N-1)+\mu*e(nT+N-1)*x(nT+N-1) \quad (3)$$

As described above, according to the present embodiment, tap coefficients to be updated are successively selected by the multiplexer 117 and the demultiplexer 118, whereby tap coefficients of a plurality of coefficient units 102-$i$ can be updated with one coefficient learning unit 120. Therefore, the circuit scale of the equalizer 100B of the present embodiment can be reduced as compared with the equalizer 100A of the second embodiment.

Note that while one coefficient learning unit 120 is provided in the present embodiment, a plurality of coefficient learning units 120 may be provided alternatively. As long as a plurality of coefficient units 102-$i$ share one coefficient learning unit 120, similar effects to those of the present invention can be obtained.

Fourth Embodiment

Figure 5:
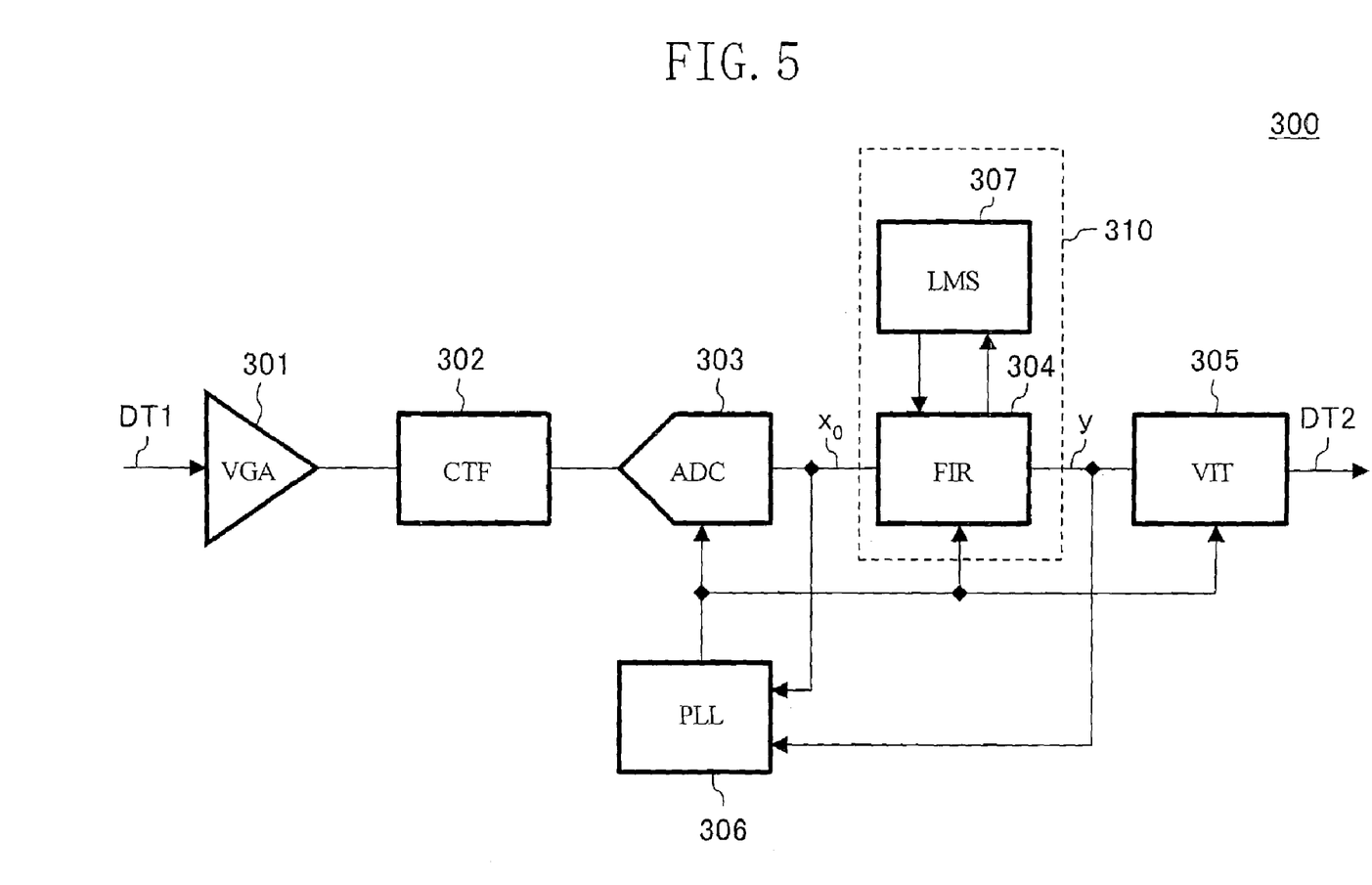
FIG. 5 is a diagram illustrating a configuration of a reproduction signal processing device of a fourth embodiment of the present invention.

FIG. 5 illustrates the configuration of a reproduction signal processing device 300 of the fourth embodiment of the present invention.

The reproduction signal processing device 300 includes a variable gain amplifier 301, an analog filter 302, an A/D converter 303, an FIR filter 304, a Viterbi decoder 305, a clock extraction circuit 306 and a coefficient updater 307. Note that the FIR filter 304 and the coefficient updater 307 correspond to a waveform equalization section 310 of the present invention.

The reproduction signal processing device 300 receives a reproduction signal DT1 read out from a recording medium and outputs a decoded signal DT2, which has been decoded by the Viterbi decoder 305. In the case of a DVD, for example, the reproduction signal DT1 is an RF signal read out from an optical disk by an optical pickup. Moreover, for the FIR filter 304 and the coefficient updater 307, the equalizer 100A of the second embodiment may be used, for example.

Next, the operation of the reproduction signal processing device 300 will be described.

The variable gain amplifier 301 adjusts the amplitude of the reproduction signal DT1 so that it is matched with the dynamic range of the analog filter 302. Then, the analog filter 302 filters the signal as a prefilter preceding the A/D converter 303 and as the first equalizer. Then, the A/D converter 303 samples the input signal into digital values to output a digital signal $x_0$. Note that the reproduction signal processing device 300 of the present embodiment does not perform a compensation operation until the time when the digital signal $x_0$ is output, even if the reproduction signal DT1 has vertical asymmetry.

Then, the waveform equalization section 310 selects one of a plurality of tap coefficient groups (as a selected coefficient group) based on one of a plurality of tap signals that are obtained by delaying the input digital signal $x_0$, as described above in the second embodiment. Then, a waveform equalization is performed on the digital signal $x_0$ using the selected coefficient group to output the waveform-equalized signal y. Finally, the Viterbi decoder 305 decodes the waveform-equalized signal y to output the decoded signal DT2.

Figure 6:
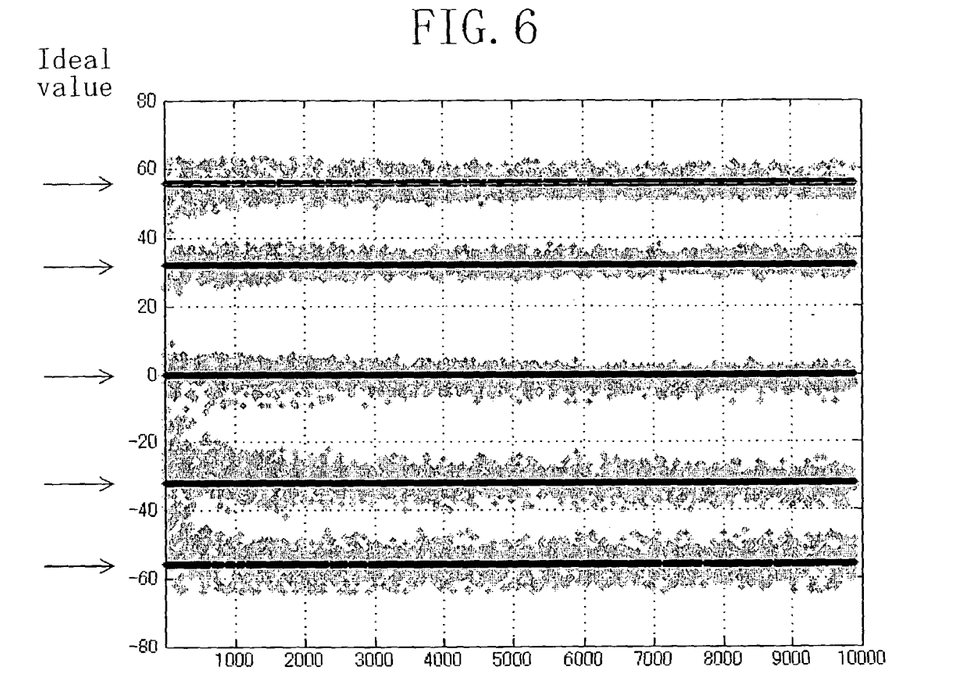
FIG. 6 is a waveform diagram illustrating a waveform obtained through a waveform equalization performed by the reproduction signal processing device of FIG. 5.

FIG. 6 illustrates the level of the waveform-equalized signal y obtained through a waveform equalization on the samples illustrated in FIG. 9 by using the reproduction signal processing device 300 of the present embodiment. As can be seen from FIG. 6, the vertical asymmetry of the waveform-equalized signal y has been compensated for, and the signal levels are converged in the vicinity of the ideal values.

As described above, according to the present embodiment, the waveform equalization section 310 performs a waveform equalization on the digital signal $x_0$, which has been obtained through A/D conversion of the reproduction signal DT1, so as to compensate for the non-linearity thereof. Thus, it is possible to realize a signal reproduction device capable of compensating for the non-linearity of an original reproduction signal from which a digital signal is to be produced.

Figure 7:
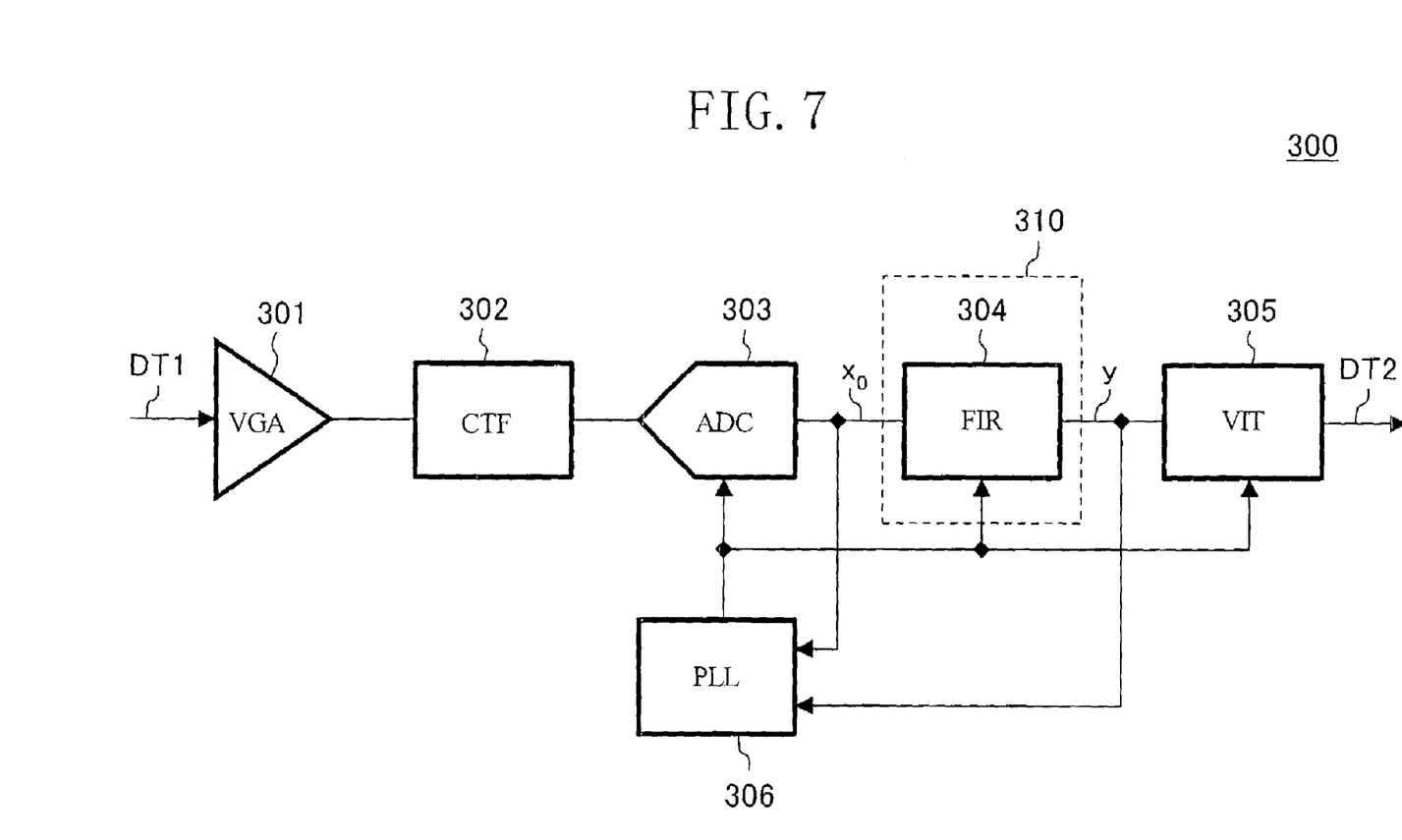
FIG. 7 is a diagram illustrating a configuration of the reproduction signal processing device of FIG. 5, in which a coefficient updater is omitted.

Note that the coefficient updater 307 may be optional. Even with the reproduction signal processing device 300 in which the coefficient updater 307 is omitted, as illustrated in FIG. 7, similar effects to those of the present invention can be obtained. Moreover, a decoder based on any other suitable decoding scheme may be used instead of the Viterbi decoder 305.

The present invention is not limited to the embodiments set forth above, but may assume other embodiments.

As described in the embodiments above, according to the present invention, it is possible to realize an equalizer capable of performing a proper convolution operation on an input signal having non-linearity such as vertical asymmetry due to the asymmetry phenomenon, etc., during the disk production process, so as to compensate for the non-linearity of the input signal. Therefore, by incorporating the equalizer of the present invention in an existing signal processing device such as a reproduction signal processing device, it is possible to improve the reproduction signal processing performance of the device.

Moreover, since the equalizer of the present invention employs a relatively simple circuit configuration, it is possible to reduce the circuit area of a reproduction signal processing device, or the like, in which the equalizer of the present invention is incorporated. Thus, it is possible to realize a reproduction signal processing device that is advantageous in reducing the cost.

What is claimed is:

1. An equalizer for performing a waveform equalization on an input signal, comprising:
   a signal delay section including a plurality of delay elements connected in series with one another for delaying the input signal by the delay elements;
   selection signal production means for producing a selection signal for selecting one of a plurality of tap signal coefficient groups as a selected coefficient group based on a reference signal, which is one of a plurality of tap signals output from the signal delay section;
   a coefficient multiplication section for selecting the selected coefficient group based on the selection signal, and multiplying the tap signals output from the signal delay section with selected tap coefficients that belong to the selected coefficient group by using a plurality of coefficient units provided in the coefficient multiplication section, respectively; and
   an adder for adding together the tap signals from the coefficient multiplication section, which have been multiplied with the selected tap coefficients, to output a sum as a waveform-equalized signal.

2. The equalizer of claim 1, wherein the selection signal production means compares a value of the reference signal with a predetermined threshold so as to produce the selection signal based on a comparison result.

3. The equalizer of claim 1, wherein the selection signal production means uses, as the reference signal, a middle tap signal that is located in a middle among the plurality of tap signals output from the signal delay section.

4. The equalizer of claim 1, further comprising a coefficient updater including a coefficient learning unit for calculating new tap coefficients for the selected tap coefficients, respectively, so that an error between an actual value of the waveform-equalized signal and an ideal value thereof is reduced, so as to update the selected tap coefficients to the new tap coefficients calculated by the coefficient learning unit, respectively.

5. The equalizer of claim 4, wherein:
   the coefficient updater includes coefficient selection means for selecting one of the selected tap coefficients to be updated; and
   the coefficient learning unit calculates the new tap coefficient for the selected tap coefficient selected by the coefficient selection means.

6. A reproduction signal processing device for processing a reproduction signal read out from a recording medium, the reproduction signal processing device comprising a waveform equalization section for performing a waveform equalization on a digital signal obtained through A/D conversion of the reproduction signal,
   wherein the waveform equalization section includes an equalizer for selecting one of a plurality of tap coefficient groups as a selected coefficient group based on one of a plurality of tap signals obtained by delaying the digital signal, so as to perform the waveform equalization by using the selected coefficient group, and
   wherein the waveform equalization section includes a coefficient updater for calculating new tap coefficients for selected tap coefficients that belong to the selected coefficient group, respectively, so that an error between an actual value of a waveform-equalized signal and an ideal value thereof is reduced, so as to update the selected tap coefficients to the new tap coefficients, respectively.

* * * * *